RECORDING AND DISPLAY SYSTEM

Filed Jan. 21, 1969

3 Sheets-Sheet 1

INVENTOR.
NORMAN L. STAUFFER

BY M. Michael Carpenter

ATTORNEY.

Feb. 2, 1971 N. L. STAUFFER 3,560,989

RECORDING AND DISPLAY SYSTEM

Filed Jan. 21, 1969 3 Sheets-Sheet 2

INVENTOR.
NORMAN L. STAUFFER
BY M. Medhat Carpenter
ATTORNEY.

Feb. 2, 1971 N. L. STAUFFER 3,560,989

RECORDING AND DISPLAY SYSTEM

Filed Jan. 21, 1969 3 Sheets-Sheet 3

INVENTOR.
NORMAN L. STAUFFER

BY M. Michael Carpenter

ATTORNEY.

United States Patent Office 3,560,989
Patented Feb. 2, 1971

3,560,989
RECORDING AND DISPLAY SYSTEM

Norman L. Stauffer, Englewood, Colo., assignor to Honeywell Inc., Minneapolis, Minn., a corporation of Delaware Continuation-in-part of application Ser. No. 595,808, Nov. 21, 1966. This application Jan. 21, 1969, Ser. No. 792,323
Int. Cl. G11b *13/06;* G01d *7/06*
U.S. Cl. 346—17 8 Claims

ABSTRACT OF THE DISCLOSURE

A recording and display system is shown including a recording medium having a transparent base with an opaque coating on one surface thereof. A stylus is transducer driven vertically across the surface as the recording medium is displaced longitudinally between storage reels for removing the opaque coating and forming a recording trace representing an input signal applied to the transducer. A plurality of transducer driven stylus units are arranged with individual light sources and lens systems for projecting the recording trace upon a display screen. Each projected recording trace is identified by color coding and may be displayed in overlapping arrangement upon the display screen. The projected recording traces are also individually manipulated and positioned upon the display screen to provide for time coincidence thereof. Photoelectric cells are provided for reproducing the recording traces at a time remote from the initial recording thereof.

This application is a continuation-in-part of application Ser. No. 595,808 which was filed on Nov. 21, 1966, now abandoned.

The present invention relates to a recording and display system and, more particularly, to a stylus recording device utilizing a transparent recording media having a thin opaque coating which is removed by the stylus for permanently recording an input signal thereon. The stylus recording device is utilized within a multichannel stylus recording and display system capable of immediately displaying a plurality of individually identifiable input signals in overlapping, time coincidence upon a display screen.

The use of a stylus or scribe as a recording instrument for an input signal is well known. The prior art is replete with devices utilizing the techniques of smoke drums, waxed surfaces, metal foils, or even glass surfaces for providing media upon which an input signal may be recorded by a suitable arranged scribe. The display of an input signal recorded by these prior art techniques has generally been difficult to project and, once projected, difficult to decipher. This difficulty increases in magnitude when it is desired to record and display a plurality of input signals.

The multichannel recording and display system of the present invention is particularly adapted for use within a low cost monitoring system as, for example, a patient monitor utilized within the medical field. In prior art monitoring systems, a cathode-ray tube has been used as the display. This arrangement produces a weak link at the display as the cathode-ray tube is not capable of providing a permanent record of a plurality of electrical input signals and is not capable of providing a simple coding scheme for the plurality of input signals which is easily decipherable by an operator of limited experience.

Accordingly, it is an object of the present invention to provide a recording and display system which permanently records an input signal by utilizing unique combination of a stylus and recording medium and, further, provides for an immediate, easily decipherable display thereof.

Another object of this invention is to provide a recording and display system for the multichannel recording and time coincident display of a plurality of input signals.

Still another object of the instant invention is to provide a multichannel stylus recording and display system wherein a plurality of input signals is immediately displayed upon a display screen with each input signal individually identifiable from the other.

Yet another object of the invention presented herein is to provide a multichannel stylus recording and display system capable of displaying a plurality of input signals in an overlapping, full scale configuration wherein each input signal is individually identifiable.

A further object of this invention is to provide a multichannel stylus recording and display system for a plurality of input signals with a plurality of modular record and projection units which may be individually and separately manipulated for positioning each of the input signals upon a display screen.

Yet a further object of the invention provides a multichannel stylus recording and display system capable of recording upon a single recording medium that is stored within a film magazine which may be easily loaded into the recording system.

Another further object of the invention herein presented is to provide a multichannel stylus recording system with a multiple display which is easily decipherable and equipped with an alarm system simple enough to provide an individual warming for each recorded channel to a person of limited operating experience.

A still further object of the present invention is to provide a permanent record of the plurality of input signals upon an economical recording medium which may be utilized in combination with a multichannel recording and display system for reproducing the input signals at a time remote from the initial multiple recording thereof.

Other objects and many of the attendant advantages of the present invention will become readily apparent to those skilled in the art as a better understanding of the present invention is obtained by reference to the following detailed description when considered in connection with the accompanying drawings, wherein.

The recording and display system of the present invention includes a recording medium having a transparent base and a thin opaque coating on one surface thereof. The recording medium is stored upon a supply reel and guided through a record and display area by suitable guiding rollers to a take-up reel. The supply and take-up reels may be mounted within a film magazine, referred to as a cassette. Individual transducer drive motors are arranged for displacing a stylus associated therewith across the recording medium in a substantially vertical direction as the recording medium is driven along its longitudinal axis. In this manner, the stylus associated individually with each transducer drive motor removes the opaque coating from the recording medium for forming a recording trace thereon in response to an electrical input signal applied to the transducer motor. Each stylus is arranged with an associated electromagnetic energy source and reflector for focusing visible light waves therefrom through the transparent base of the recording medium, exposed by the stylus formation of the recording trace, onto a projection lens system. The projection lens system, in turn, focuses the visible light waves upon a display screen through a color filter for identifying the projection recording trace thus formed.

The transducer motor, stylus, lens system, and color filter are constructed in a single modular record and projection unit having an electromagnetic energy source individually associated therewith. A plurality of these record and projection units are arranged in a longitudinally and vertically offset relationship with the recording medium for providing a multi-channel recording and display system. Through this unique grouping a plurality of recording traces may be projected upon the display screen with contrasted color coding for individual identification. Further, the longitudinal displacement of the modular units may be corrected by the proper direction alignment of the lens system for establishing a true time coincidence of multiple projected recording traces. Finally, the unique relationship between the recording medium, lens system, and display screen allows a plurality of input signals to be permanently recorded in individual tracks upon the recording medium and then projected upon the display screen as overlapping traces individually identifiable by color contrast.

Figures 1, 3, 4:
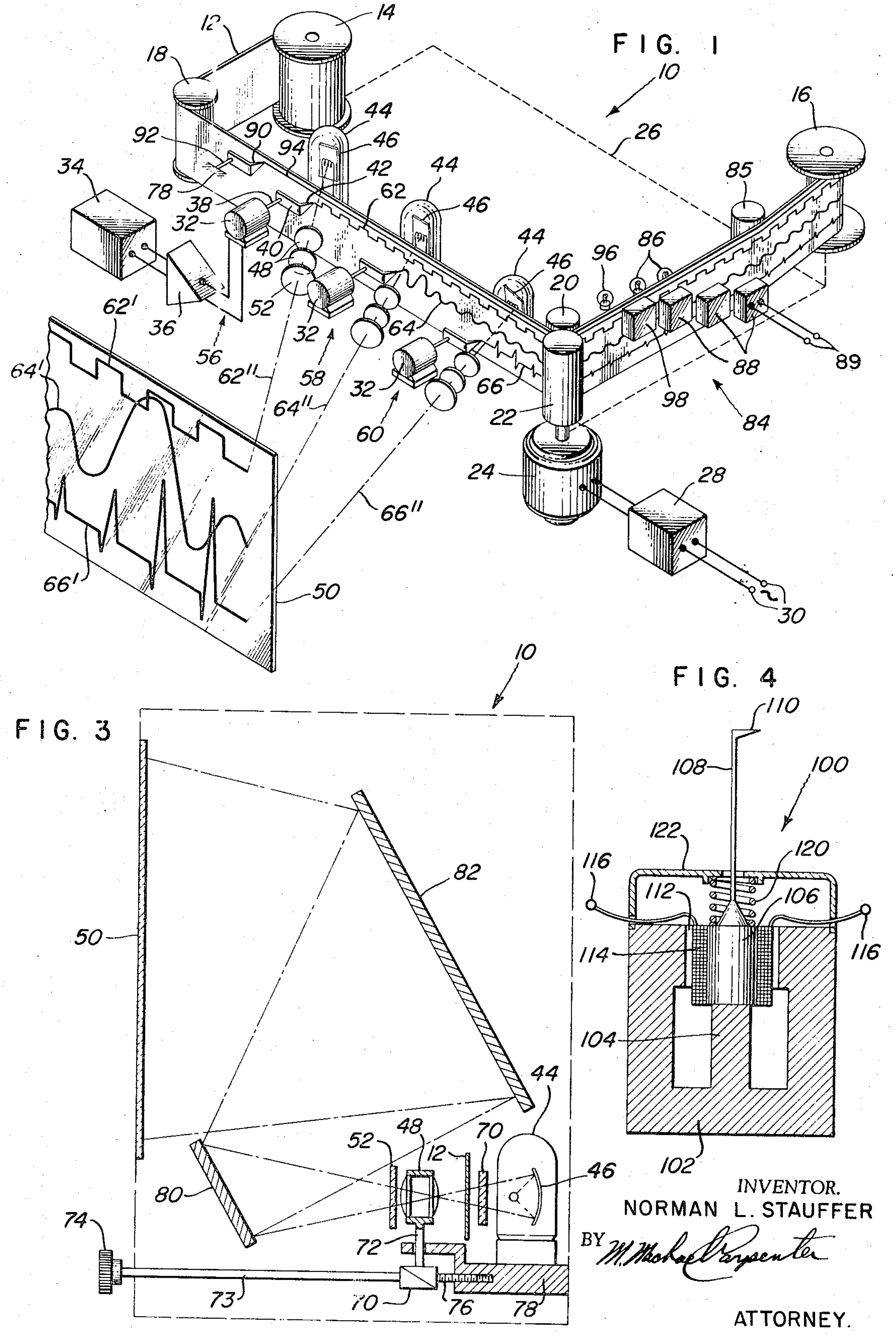
FIG. 1 is a perspective view, representing a recording and display system embodying the present invention.
FIG. 3 is a side elevation view, showing the lens and mirror system of FIG. 2 in more detail.
FIG. 4 is a side elevation, illustrating a linear transducer which may be utilized within the present invention for driving a stylus.

Referring now to the drawings, FIG. 1 shows a multi-channel stylus recording and display system 10 including a recording medium 12 and supply and take-up reels, 14 and 16. The recording medium is guided from the supply reel 14 around a roller guide 18 through a record and display area and around a second roller guide 20 to the take-up reel 16. A capstan 22 is arranged to pinch the recording medium against the roller guide 20 and is driven by a drive motor 24 for imparting longitudinal motion to the recording medium. The drive motor 24 may also supply the rotational driving torque to the supply and take-up reels, 14 and 16, through a suitable driving linkage shown as dashed line 26. A flexible shaft arrangement could be utilized as the driving linkage. The drive motor 24 is a constant speed motor, such as an A.C. synchronous motor, energized by a power supply 28 and A.C. source connected to terminals 30. The motor is connected to the capstan 22 through a suitable gear train arrangement, not shown, for imparting various longitudinal recording speeds to the recording medium.

A plurality of transducer drive motors 32 are provided, each receiving an individual electrical input signal from an input device 34 through an amplifying means 36. Each transducer drive motor 32 is associated with an input device and amplifying means; however, only one is shown for simplicity. The transducers, shown in FIG. 1, angularly displaces an output shaft 38 for producing a rotational output proportional to the input signal received thereby. An arm 40 attaches at one end thereof to the end of shaft 38, while the second end thereof mounts a stylus 42. The stylus 42 is thus held in a contacting arrangement against a recording surface of the recording medium 12. The rotational motion of the shaft 38 and arm 40 produces a slight curvilinear motion between the stylus 42 and recording medium 12. The distortion caused thereby is minor and is completely eliminated by the use of a linear transducer, as will be described hereinbelow with reference to FIG. 4. The recording medium is formed with a transparent base from the group of polyester materials, such as polyethylene terephthalate. A thin opaque coating is applied to one surface of the transparent base for forming a recording surface thereon. The actual recording surface may be formed in several ways, such as coating with a graphite impregnated paint. What is essentially required is a very thin but opaque coating which may readily be removed by the application of a fine stylus point. The recording surface and its associated opaque coating should have enough abrasion resistance to stand up under a modest amount of handling.

A source of electromagnetic energy in the form of a projection lamp 44 is provided behind the recording medium 12 and opposite each transducer drive motor 32 and associated stylus 42. Each projection lamp 44 is arranged with an internal reflector 46 for directing a beam of electromagnetic waves in the visible light range through an associated recording trace. The recording trace being defined as an area of the recording medium which has been made transparent by the stylus removal of the opaque coating in response to an input signal. The light which passes through the recording trace is focused upon a projection lens system 48 which magnifies the image produced thereby for projecting it upon a display screen 50 in the form of a projected recording trace. The display screen is a partly transparent body which may be formed from a translucent material, such as frosted glass. In the present embodiment, the projection lens system is constructed from two plano-convex lenses and one double-concave lens, although only two plano-convex lenses are shown for simplicity. A color filter 52 is provided within the projection path of each recording trace for identifying the projected recording trace which forms upon the display screen 50. Further, color filters may be utilized to provide an alarm when an individual recorded and displayed input signal exceeds a predetermined value, as discussed hereinbelow with reference to FIG. 5.

Each transducer drive motor 32 and its associated stylus 42 combines with a projection lens system 48, projection lamp 44, and a color filter 52 for forming a modular record and projection unit 56 which mounts in juxtaposition with a plurality of similar units, such as modular units 58 and 60 shown. As each modular unit is identical, except for the color of the filters 52, the identifying numbers have been omitted from all modular units but one, modular unit 56. It should be understood that the present invention is not intended to be limited to the three modular units shown; but as many units as desired may be incorporated within a recording and display system, limited only to the physical space made available therein. Each modular record and projection unit is vertically offset from the others for insuring that the recording trace, cut by the removal of the opaque coating from the recording surface of the medium 12, does not interfere or overlap a second recording trace. For example, modular record and projection unit 56 produces a recording trace 62; while modular units 58 and 60 produce recording traces 64 and 66, respectively. Each recording trace is confined to an area whose maximum height is substantially equal to an area illuminated by the projection lamps 44, for example 2 mm. Therefore, one limitation on the maximum number of channels within a recording and display system is the width of the recording medium being utilized and the maximum amplitude of the recording trace being recorded thereon. The modular units are also offset longitudinally along the record and display area of the recording medium for allowing modular units of identical construction to be utilized. Here again, the number of channels within the recording and display system are limited by the physical width of the record and display area, located between the roller guides 18 and 20. Obviously, the modular design for each unit can be altered to increase the number of units within a given longitudinal area. As for example, the shafts 38 of alternate transducers may be extended thereby allowing them to be placed in a closer side-by-side relationship.

Due to the longitudinal offset relationship of each modular unit to the other, it is necessary to correct the focal path of the projection lens systems 48 for focusing each image, formed at the contact point between the stylus 42 and recording medium 12, in a coinciding vertical line at an edge of the display screen 50. This arrangement corrects the longitudinal offset position of the recording traces to provide a true time coincidence of the projected recording traces. The coinciding vertical line can best be seen in FIG. 2 at 68. A heat filter 70 is provided between the recording medium 12 and each projection lamp 44, opposite each stylus 12. The heat filters 70 prevent heat, generated by the projection lamps 44, from damaging the recording medium and, further, provide support for the recording medium at its contact point with each stylus 42. Thus, the heat filters prevent the recording medium 12 from being pushed out of focus by the stylus contact pressure or heat distortion.

Figure 2:
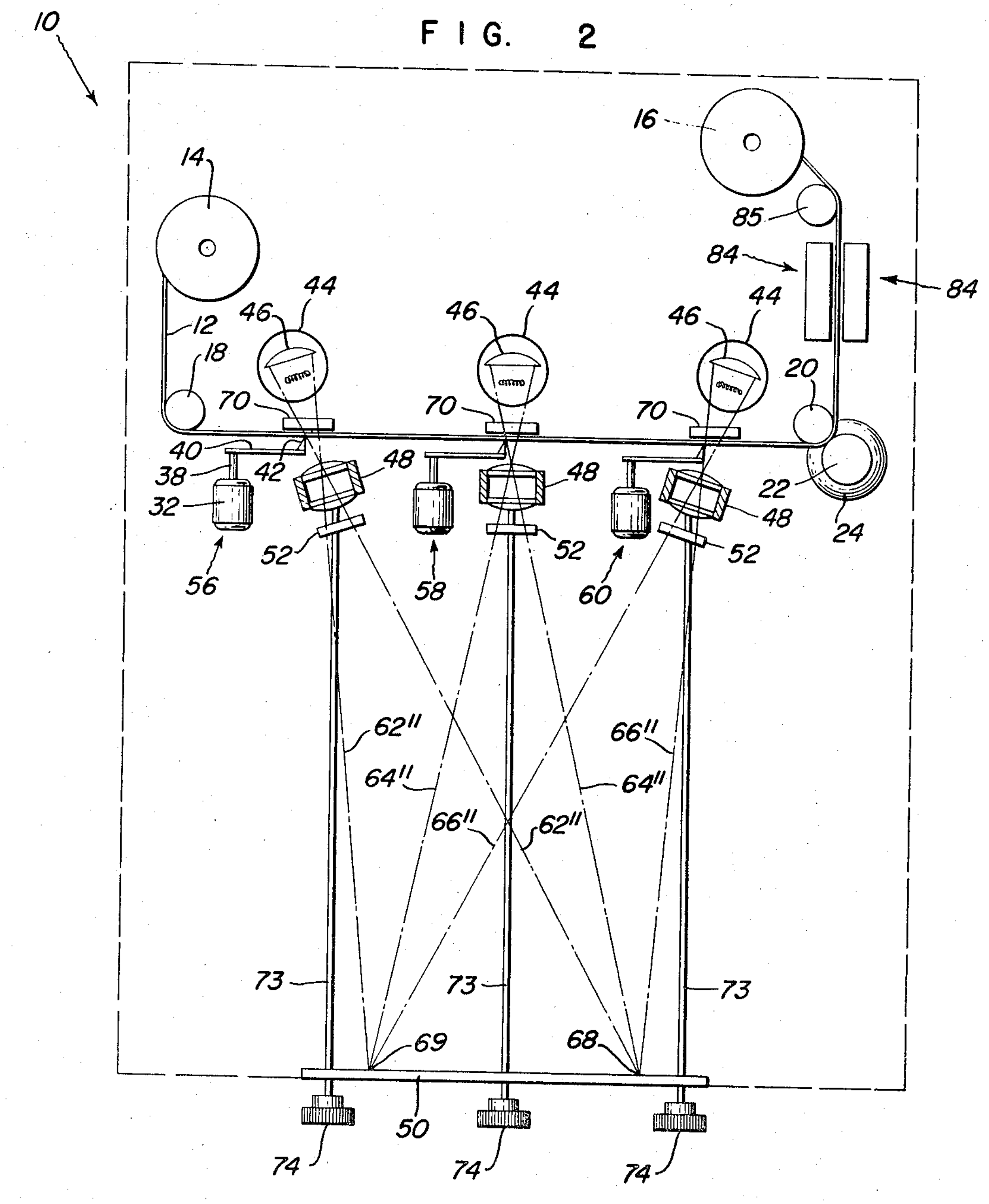
FIG. 2 is a top horizontal view, showing the lens projection system of the present invention.

Each modular record and projection unit 56, 58, and 60 is aligned for projecting the contact point of its associated stylus 42 with the recording medium 12 toward the vertical time coincidence line 68. While this relationship may be permanently established by internally adjustable means, the vertical adjustment thereof is not. The projection lens systems 48 are each mounted upon a two piece vertical adjustment block 71, FIG. 3. The lens system is attached to the upper portion of the block 71 by a shaft 72, while the lower portion thereof is attached by a shaft 73 to a control knob 74. The knob 74 is located externally from the multichannel stylus recording and display system 10, as shown in FIGS. 2 and 3. A threaded end portion 76 of shaft 73 cooperates with a threaded frame portion 78. The frame portion 78 also encompasses the shaft 72 for restraining the lateral motion thereof. The rotation of the knob 74 and the shaft 73 moves the shaft along its longitudinal axis for displacing the lower portion of block 71 therewith. An inclined surface on the lower portion of block 71 engages slidably against a second similar portion on the upper portion of block 71. Thus, the upper portion raises along the inclined surface of the lower portion, due to the lateral restraint of the frame 78. As the upper portion of block 71 raises, it vertically displaces the projection lens system 48 through connecting shaft 72. As illustrated in FIG. 2, the projection path from the projection lamps 44 through the respective recording traces 62, 64, 66 to the display screen 50 is relatively long. This path may be shortened, relative to the modular record and projection units 56, 58, and 60, by the addition of a plurality of mirrors 80 and 82, FIG. 3. This arrangement allows the outer dimensions of the recording and display system 10 to be substantially reduced.

Once the plurality of input signals have been recorded, it is often desired to reproduce these signals at a time remote from the initial recording. For this purpose a machine retrieval system 84, FIGS. 1 and 2, may be incorporated into the recording and display system. The path between the roller guide 20 and the take-up reel 16 is extended to accommodate the machine retrieval system 84 and a third roller guide 85. A source of electromagnetic energy 86 is provided for each recording trace 62, 64, and 66. The visual light waves therefrom pass through the transparent base of the recording medium 12, exposed by the respective recording traces thereon, and fall upon a photoelectric cell 88 provided for each recording trace. The photoelectric cells 88 are so arranged that their output signals across terminals 89, only one set is shown, are proportional to the amplitude of the recording traces next to which they are disposed. Each photoelectric cell is longitudinally offset from the next by an amount equal to the longitudinal offset between the modular record and projection units which formed the respective recording traces. In this manner time coincidence is achieved during the reproduction of the input signals. A fixed stylus 90 is positioned, within the record and display area, on an arm and shaft arrangement 92 which is permanently affixed to the frame 78. The fixed stylus 90 produces a straight line reference trace 94 corresponding to the relative vertical position of the recording medium within the record and display area. An electromagnetic energy source 96 and a photoelectric cell 98 are provided within the machine retrieval system 84 for reproducing the reference trace 94, as a reference signal. The reference signal thus produced is utilized to correct errors within the output signals, from the photoelectric cells 88, caused by the vertical skew of the recording medium.

FIG. 4 illustrates a transducer drive motor 100 which is capable of true rectilinear motion upon the recording surface of the recording medium 12. The unit, shown diagrammatically, is similar to a conventional loud speaker drive unit with a base magnet 102 having an inner cylindrical portion 104. A cylindrically shaped outer portion 106 is slidably arranged over the inner portion 104 with a shaft 108 centrally attached thereto. A stylus 110 mounts upon the end of the shaft 108. The base magnet 102 extends upwardly about the inner cylindrical portion 104 in a U-shaped arrangement for forming an air gap 112 about the upper side surfaces of the inner portion. A coil 114 is disposed about the outer cylindrical portion 106 within the air gap 112. The coil is arranged with input signal terminals 116 and is displaced upwardly into the air gap 112 when an electrical input signal is induced thereacross. A spring 120 is provided for urging the inner cylindrical portion 106 toward a downward position. The spring 120 is retained in its position by a suitable assembly over 122. The relationship between the outer and inner cylindrical portions 106 and 104 may be arranged for providing a dash pot, or damping, action therebetween. This transducer drive motor may be used to eliminate errors formed by the absence of a true rectilinear stylus displacement. The transducer drive is also suitable for reducing the amount of space required for each modular record and display unit.

Figure 5:
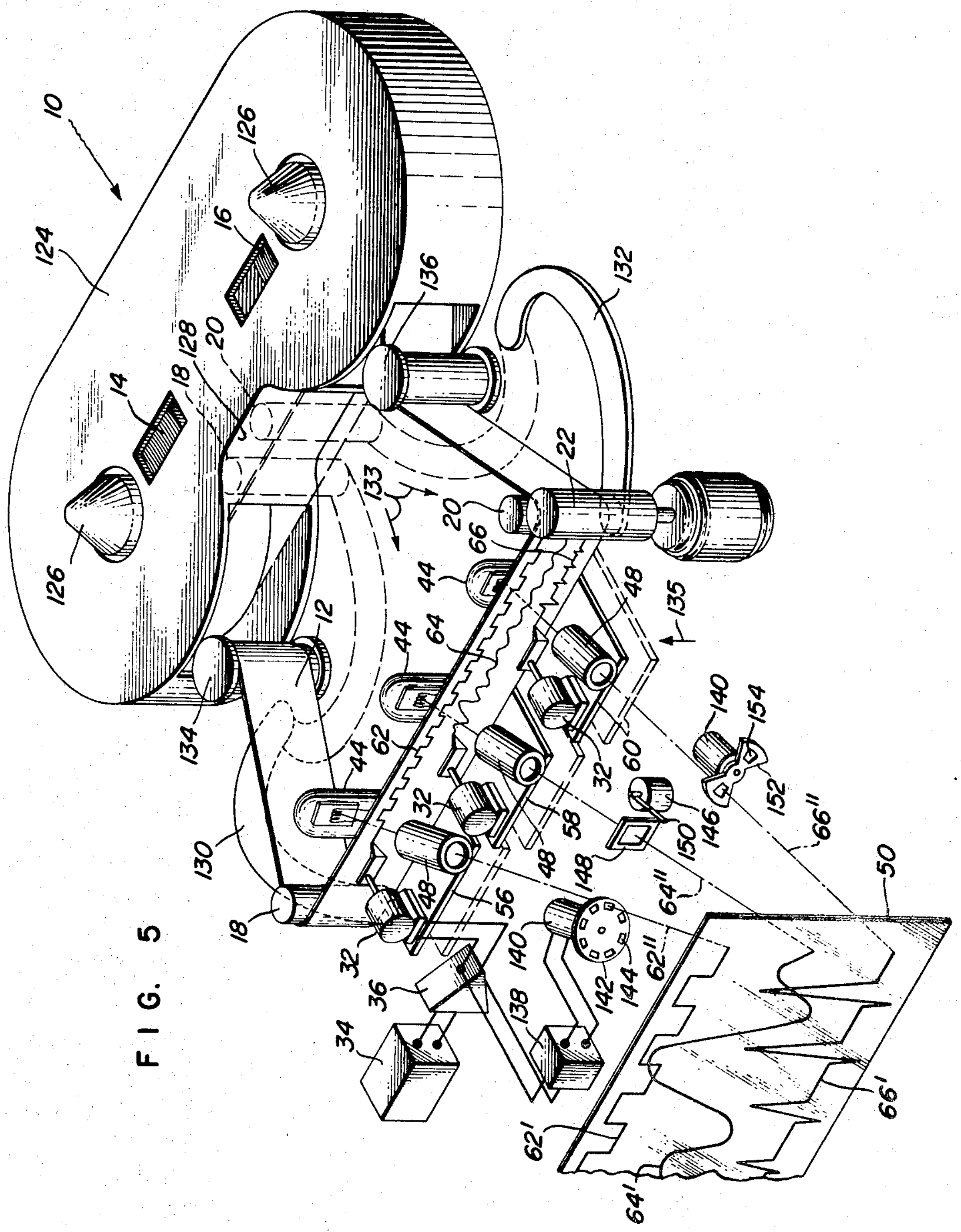
FIG. 5 is a perspective view, similar to FIG. 1, showing a recording and display system embodying a film magazine and alarm systems.

In FIG. 5, the recording and display system 10 of the present invention is arranged to be easily loaded with a film magazine or cassette 124 which holds the recording medium 12. The cassette mounts the supply and take-up reels, 14 and 16, in a manner which is well known in the art. Driving linkage 26, FIG. 1, is connected to conically shaped hub members 126 which support the cassette 124 within the recorder 10 and impart rotational motion to the reels. The cassette is relieved at 128 to provide clearance for the roller guides 18 and 20 which, in this embodiment, are rotatably mounted upon pivot arms 130 and 132. The recording medium 12 is stretched across the relieved portion 128 of the cassette between the supply and take-up reels 14 and 16. The roller guides 18 and 20 thus fit between the cassette and the recording medium 12, as shown in phantom lines, when the cassette is loaded within the recorder 10. The roller guides 18 and 20, located on one end of each of the pivot arms, are then pivoted outwardly in a direction indicated by arrows 133 by the pivot arms 130, 132 to the operating position shown in FIG. 5 by the solid lines. Rollers 134 and 136 retain the recording medium 12 against the cassette 124 for forming an operating loop. In this position, the guide roller 20 engages the capstan 22 for drawing the recording medium 12 from the supply reel 14, over the roller 134, around guide roller 18 through the record and display area, around the guide roller 20 to the roller 136 and onto the take-up reel 16. After the pivot arms 130 and 132 draw the recording medium 12 from the cassette 124, the modular record and projection units 56, 58 and 60 are raised, arrow 135, into their operating position against the recording medium 12. The motion of the pivotal arms 130, 132 and the modular units 56, 58 and 60 may be controlled through the utilization of levers, not shown.

The projection lamps 44 are arranged such that their internal reflectors 46 direct visible wavelengths of electromagnetic energy through the projection lens systems 48 which focus the radiation upon the display screen 50. As the radiation is directed toward the displaced screen 50, it may be passed through one of several alarming devices. For example, the transducer 32 associated with the record and projection module 56 is provided with an electrical input signal from an input device 34 and amplifier 36. An alarming circuit 138 is arranged to sense the output of the amplifier 36 and provide a switching action when this output exceeds a predetermined value. It will be understood that, while only one input device 34, amplifier 36, and alarming circuit 138 is shown, each of the plurality of projection and recording modules are provided with these inputs. An example of an alarming circuit which could be utilized is illustrated in patent application, Ser. No. 588,526 filed on Oct. 21, 1966 by Joseph Gormley, now Pat. No. 3,439,228, which is assigned to the same assignee as the present invention.

When the value of the electronic input signal exceeds a predetermined value the output of the alarm circuit 138 causes a motor 140 to become energized for rotating a disc 142 having a plurality of apertures 144 therein. The disc interrupts the projection from the lens system 48 for causing the projected recording trace 62' to appear as a signal which is flashing on and off. The apertures could be provided with a color filter which would cause the signal to change color as it flashes. Similarly, other alarming devices could be provided, such as a solenoid 146 which is connected to a color filter 148 by a suitable leverage mechanism 150. As the input signal exceeds its predetermined value, the solenoid is energized for interrupting the trace projection 64'' thus changing the color of the projected recording trace 64' upon the display screen 50. In a final embodiment of the alarm, the motor 140 is connected to a butterfly shaped disc 152 provided with apertures 154 which contain color filters. As the input signal exceeds its predetermined value, the alarm circuit 138 is triggered for rotating the motor 140. The trace projection 66'' then appears on the display screen 50 as a recording trace that changes color in a sequentially flashing manner. The alarm circuits and mechanisms thus described provide a convenient means for deciphering the plurality of recorded electrical input signals upon the display screen 50. The alarm circuit 138 is adjustable for raising or lowering the point at which the alarm mechanism is actuated. This arrangement provides a simple means for deciphering the plurality of input signals recorded upon the recording medium 12 and immediately projected upon signals recorded upon the recording medium 12 and immediately projected upon the display screen 50.

In operation, the magnification of the projection lens system 48 displays an enlarged projected recording trace 62' upon the display screen 50. For example, if the maximum amplitude of each recording trace is 2 mm. and the display screen is 8 inches high, a magnification of 100 to 1 produces a full scale 8-inch displacement of the projected recording trace 62' for a 2 mm. displacement of the stylus 42, which forms the recording trace 62. In the present embodiment a diamond tipped stylus, such as conventionally used within a phonograph reproduce needle, will produce a recording trace upon the surface of the recording medium 12 that is 7.5 microns wide. This results in a ratio of peak-to-peak displacement to trace width of over 260 to 1 and insures a projected recording trace that is easily decipherable. As described hereinabove, each modular record and projection unit is arranged to direct the contact point of the stylus and the recording medium toward a common vertical line 68. Each tract projection 62'', 64'' and 66'' passes through a separate color filter 52 for providing each projected recording 62', 64' and 66' with its own individually identifiable color coding. As the recording medium 12 is longitudinally displaced toward the right, the recording traces thereon remain within an illuminated area from its respective projection lamp 44. The visible light waves which pass through each recording trace within this illuminated area form the projected recording traces upon the display screen 50.

As seen in FIG. 2, the projected recording traces extend from the vertical line 68 to the left, across the display screen 50, to a final vertical line 69. Thus, each projection lens system 48 is arranged to illuminate the same area of the display screen 50 with the plurality of recording traces upon the recording medium moving from left to right and the resultant projected recording traces move from right to left across the display screen. Due to this unique arrangement, each transducer drive motor may respond to an increased input signal for producing a recording trace with an increased amplitude, as for example recording traces 64 and 66. These recording traces will not overlap each other upon the recording medium 12, as each is confined within a separate vertically offset strip, 2 mm. wide, upon the recording surface. However, each recording trace is capable of producing a projected recording trace having a maximum amplitude of 8 inches upon the display screen 50. Therefore, it is common for these multicolored projected recording traces to overlap, as illustrated by the traces 64' and 66' in FIG. 1. The presence of the color filters 52 prevents confusion among the multichannel projected recording traces, as they overlap one another during display. The separate control knobs 74 provide for manipulation and positioning of the projected recording traces independently upon the display screen 50. Further, a control of each projection lamp intensity, not shown, provides for adjustment of the intensity of each projected recording trace of the total removal thereof from the display screen.

Once the plurality of input signals are recorded upon the recording medium 12 as recording traces, the recording may be rewound and passed through the record and display area for projecting the traces upon the display screen 50 as often as desired. Further, the recording medium may be stopped for allowing a close study of each recording trace. If it is desired to reproduce the input signals, the recording medium may be rewound after recording and passed through the machine retrieval system 84 for providing a plurality of output signals equal or proportional to the previously recorded input signals. Although the recording and display system shown herein is utilized with three input signals, it should be understood that a greater or lesser number may be recorded and displayed without departing from the scope of the present invention.

Thus, there has been described a recording and display system which may be easily loaded with an economical recording medium for permanently recording and immediately displaying a plurality of electrical input signals. The immediate display is projected across the full face of the display screen in an over-lapping manner with each trace color coded to provide for an easily decipherable display. The recording and display system also provides an alarming arrangement wherein an input signal which exceeds a predetermined value is immediately called to the attention of the operator for further improving the ability of an inexperienced operator to monitor the plurality of input signals being recorded and displayed. The cassette loading arrangement allows the operator of limited experience to load and unload the recording and display system with a minimum opportunity for error. The information thus recorded may be stored for future reference and may easily be returned to the recording and display system for further display or reproduction.

Obviously, many modifications and variations of the present invention will become apparent to those skilled in the art, in light of the above teachings, and it should therefore be understood that the embodiments described hereinabove are illustrations rather than limitations of the scope of the present invention. Consequently, the present invention should be limited only by the appended claims.

The embodiments of the invention in which an exclusive property or privilege is claimed are defined as follows:

1. A multichannel stylus recording and display system for permanently and continuously recording and immediately displaying a plurality of input signals, comprising:

a single recording means having a transparent base member and an opaque coating thereon;

a plurality of transducer means, each including individual stylus means contacting said single recording means in a vertically offset relationship arranged to be displaced across nonoverlapping parallel areas of said single recording means in response to one of said input signals for removing said opaque coating therefrom and exposing the transparent base thereof;

drive means for moving said single recording means continuously passed said plurality of stylus means, thereby permanently recording said plurality of input signals upon said nonoverlapping parallel areas of said single recording means;

sources of electromagnetic energy;

display screen means;

means for directing visible wavelengths from said sources of electromagnetic energy through said exposed transparent base means of said single recording means at said contacting points of said stylus means;

lens means individually associated with each transducer means and stylus means for immediately focusing said visible wavelengths passing through said exposed transparent base means upon the full surface of said display screen means; and color filter means individually associated with each of said lens means for color coding said visible wavelengths of electromagnetic energy as it is focused upon the full surface of said display screen means by said lens means in a magnified overlapping relationship thereby immediately and continuously displaying said plurality of recorded input signals; whereby said color coded plurality of input signals retain said color coding when overlapping each other upon said display screen means.

2. A multichannel stylus recording and display system as claimed in claim 1, additionally comprising:

means for monitoring said plurality of input signals applied to said plurality of transducer means arranged for producing an output signal when one of said plurality of input signals exceeds a predetermined value; and alarm means connected to said means for monitoring said input signals arranged to interrupt said visible wavelengths of electromagnetic energy focused upon the full surface of said display screen means for providing a visual change of said focused wavelengths forming one of said displays of said plurality of input signals when said input signal exceeds said predetermined value.

3. A multichannel stylus recording and display system as claimed in claim 1, additionally comprising:

magazine means including supply and take-up means for storing said single recording medium; and guide means associated with said drive means for guiding said recording medium from said magazine means passed said plurality of stylus means.

4. A multichannel stylus recording and display system as claimed in claim 3, additionally comprising:

said guide means including hub means for mounting said magazine means and pivotal guide means;

said magazine means arranged to be mounted upon said hub means and to receive said pivotal guide means; and said pivotal guide means arranged to remove said single recording medium from said magazine means and urge said single recording medium into driving contact with said drive means.

5. A multichannel stylus recording and displaying system for permanently and continuously recording and immediately displaying a plurality of input signals, comprising:

a single recording means having a transparent base member and an opaque coating thereon;

a plurality of transducer means, each including individual stylus means contacting said single recording means in a vertically offset relationship arranged to be displaced across nonoverlapping parallel areas of said single recording means in response to said plurality of input signals for removing said opaque coating therefrom and exposing the transparent base thereof;

drive means for moving said single recording means continuously passed said plurality of stylus means, thereby permanently recording said plurality of input signals upon said nonoverlapping parallel areas of said single recording means;

sources of electromagnetic energy;

display screen means;

means for directing visible wavelengths from said electromagnetic energy sources through said exposed transparent base means of said single recording means at said contacting points of said stylus means;

lens means individually associated with each transducer means and stylus means for immediately focusing said visible wavelengths passing through said exposed transparent base means upon the full surface of said display screen means;

individual ones of said transducer means, stylus means, sources of electromagnetic energy, means for directing said energy, and lens means formed into recording and projecting modules; and adjustable means connected to each recording and projecting module for centering said focused visible wavelengths passing through said nonoverlapping parallel areas of said single recording means upon the full surface of said display screen means in magnified overlapping relationship thereby immediately and continuously displaying said plurality of recorded input signals.

6. A multichannel stylus recording and displaying system as claimed in claim 5, additionally comprising:

second sources of electromagnetic energy arranged for directing the visible wavelengths therefrom through said exposed transparent base means representing individual input signals of said plurality of input signals;

a plurality of photoelectric cell means individually arranged in vertical offset relationship for receiving said visible wavelengths through said individually exposed transparent base means; and each of said photoelectric cell means incuding output means for individually reproducing an output signal which is equivalent to said individual input signal previously recorded upon said single recording means.

7. A multichannel stylus recording and displaying system as claimed in claim 5, additionally comprising:

shield means arranged between said sources of electromagnetic energy and said single recording means for reducing the amount of thermal energy transmitted to said single recording means and for providing a support for said single recording means against the contact of said stylus means.

8. A multistylus recording and display system for permanently and continuously recording and immediately displaying a plurality of input signals, comprising:

a single recording means having a transparent base means and an opaque coating thereon;

a plurality of transducer driven stylus means contacting said single recording means along vertically offset portions thereof arranged to remove said opaque coating therefrom in response to said plurality of input signals;

magazine means including supply and take up means for storing said single recording means;

drive means for urging said single recording means from said magazine means and into contact with said plurality of transducer driven stylus means for permanently recording said plurality of input signals applied to said transducer driven stylus means by removing said opaque coating and exposing said transparent base means along a plurality of nonoverlapping parallel areas of said single recording means;

sources of electromagnetic energy;

display screen means;

lens means individually associated with each transducer driven stylus means for focusing electromagnetic energy from said sources of electromagnetic energy through said exposed transparent base means of said single recording means, at said contacting point of said stylus means, onto the surface of said display screen means;

color filter means arranged with each individual lens means for color coding said electromagnetic wavelengths as said wavelengths are focused upon the surface of said display screen means thereby providing each displayed input signal with an individual color code; and alarm means individually arranged with said lens means and said color filter means for sensing said plurality of input signals and interrupting said immediate display of said input signals upon the surface of said display screen means when one of said plurality of input signals exceeds a predetermined value.

References Cited

UNITED STATES PATENTS

| | | | |
|---|---|---|---|
| 2,299,738 | 10/1942 | Collins | 178—5.6 |
| 2,859,659 | 11/1958 | Fenske et al. | 33—20 |
| 3,151,927 | 10/1964 | Angst et al. | 346—25 |
| 3,273,160 | 9/1966 | Shapiro et al. | 346—77 |
| 3,401,392 | 9/1968 | Richards | 346—17 |

JOSEPH W. HARTARY, Primary Examiner

U.S. Cl. X.R.

250—219; 346—77; 353—44, 84